United States Patent [19]
McCarty et al.

[11] Patent Number: 6,095,196
[45] Date of Patent: Aug. 1, 2000

[54] TORTUOUS PATH FLUID PRESSURE REDUCTION DEVICE

[75] Inventors: Michael Wildie McCarty; Ted Alan Long, both of Marshalltown; Douglas Paul Gethmann, Gladbrook; Paul Jay Schafbuch, Marshalltown, all of Iowa

[73] Assignee: Fisher Controls International, Inc., Clayton, Mo.

[21] Appl. No.: 09/313,728

[22] Filed: May 18, 1999

[51] Int. Cl.[7] .................................................. F15D 1/00
[52] U.S. Cl. ........................... 138/42; 138/40; 251/127; 137/625.3
[58] Field of Search ................ 138/42, 43, 40; 137/625.3, 625.32; 251/127

[56] References Cited

U.S. PATENT DOCUMENTS

| | | | |
|---|---|---|---|
| Re. 31,105 | 12/1982 | Bates, Jr. ................. | 137/625.3 |
| Re. 32,197 | 7/1986 | Self ......................... | 251/127 |
| 1,243,134 | 10/1917 | Binckley .................. | 137/485 |
| 1,650,196 | 11/1927 | Demuth .................... | 119/302 |
| 2,126,991 | 8/1938 | Griswold .................. | 210/429 |
| 3,133,557 | 5/1964 | Gongwer ................... | 137/512.1 |
| 3,316,936 | 5/1967 | Gongwer ................... | 137/625.28 |
| 3,323,550 | 6/1967 | Lee, II ..................... | 138/39 |
| 3,375,855 | 4/1968 | Deeks ...................... | 138/42 |
| 3,451,404 | 6/1969 | Self ......................... | 137/625.3 |
| 3,513,864 | 5/1970 | Self ......................... | 137/625.28 |
| 3,514,074 | 5/1970 | Self ......................... | 137/625.28 |
| 3,529,628 | 9/1970 | Cummins ................. | 137/625.3 |
| 3,532,126 | 10/1970 | Boothe ..................... | 138/43 |
| 3,631,891 | 1/1972 | Brumm ..................... | 137/625.3 |
| 3,678,963 | 7/1972 | Betts et al. ............... | 138/41 |
| 3,688,800 | 9/1972 | Hayner et al. ........... | 138/42 |
| 3,722,854 | 3/1973 | Parola ...................... | 251/127 |
| 3,780,767 | 12/1973 | Borg et al. ............... | 137/625.3 |
| 3,802,537 | 4/1974 | White ...................... | 138/42 X |
| 3,813,079 | 5/1974 | Baumann et al. ........ | 251/127 |
| 3,856,049 | 12/1974 | Scull ........................ | 138/42 |
| 3,894,716 | 7/1975 | Barb ........................ | 251/127 |
| 3,899,001 | 8/1975 | Orme ....................... | 137/625.3 |
| 3,908,698 | 9/1975 | Baumann .................. | 137/625.3 |
| 3,917,221 | 11/1975 | Kubota et al. ............ | 138/42 X |
| 3,921,668 | 11/1975 | Self ......................... | 138/42 X |
| 3,941,350 | 3/1976 | Kluczynski .............. | 138/42 |
| 3,954,124 | 5/1976 | Self ......................... | 138/42 |
| 3,971,411 | 7/1976 | Baumann .................. | 137/625.3 |
| 3,978,891 | 9/1976 | Vick ........................ | 138/42 |
| 3,995,664 | 12/1976 | Nelson .................... | 138/43 |
| 4,008,737 | 2/1977 | Kluczynski et al. ..... | 137/625.3 |
| 4,024,891 | 5/1977 | Engel et al. ............. | 137/625.3 |
| 4,060,099 | 11/1977 | Bates, Jr. ................. | 137/625.3 |
| 4,068,683 | 1/1978 | Self ......................... | 137/625.3 |
| 4,079,754 | 3/1978 | Porter ...................... | 138/42 |
| 4,105,048 | 8/1978 | Self ......................... | 138/42 |
| 4,125,129 | 11/1978 | Baumann .................. | 137/625.3 |
| 4,127,146 | 11/1978 | Self ......................... | 137/625.3 |
| 4,221,037 | 9/1980 | Seger ....................... | 138/42 |

(List continued on next page.)

FOREIGN PATENT DOCUMENTS

| | | |
|---|---|---|
| 515165 | of 0000 | Australia . |
| 273597 | 1/1927 | United Kingdom . |
| WO 9748930 | 12/1997 | WIPO . |

OTHER PUBLICATIONS

Article—"Coefficients and Factors Relating to the Aerodynamic Sound Level Generated by Throttling Valves", H. D. Baumann, *Noise Control Engineering Journal*, Jan. Feb. 1984, pp. 6–11.

*Primary Examiner*—Patrick Brinson
*Attorney, Agent, or Firm*—Marshall, O'Toole, Gerstein, Murray & Borun

[57] ABSTRACT

A fluid pressure reduction device with tortuous flow paths in stacked disks. The fluid flow outlets are maintained independent by directed flow paths to avoid flow collisions in the exiting flow streams. A flow straightening section includes an inwardly tapered end section at the fluid flow outlets. Splitting of a tortuous flow path into at least two sub-flow paths with balancing of the mass flow between the sub-flow paths.

16 Claims, 3 Drawing Sheets

U.S. PATENT DOCUMENTS

| | | | |
|---|---|---|---|
| 4,249,574 | 2/1981 | Schnall et al. | 137/625.3 |
| 4,258,750 | 3/1981 | Schnall et al. | 137/625.3 |
| 4,267,045 | 5/1981 | Hoof | 137/625.37 |
| 4,279,274 | 7/1981 | Seger | 138/42 |
| 4,327,757 | 5/1982 | Weevers | 137/625.3 |
| 4,335,744 | 6/1982 | Bey | 138/42 X |
| 4,352,373 | 10/1982 | Kay et al. | 137/561 A |
| 4,356,843 | 11/1982 | Baumann | 138/43 |
| 4,398,563 | 8/1983 | Kay et al. | 138/42 |
| 4,407,327 | 10/1983 | Hanson et al. | 137/625.3 |
| 4,429,714 | 2/1984 | Hughes et al. | 137/625.3 |
| 4,456,033 | 6/1984 | Kay et al. | 138/42 |
| 4,473,210 | 9/1984 | Brighton | 137/625.3 X |
| 4,479,510 | 10/1984 | Bey | 137/625.31 |
| 4,567,915 | 2/1986 | Bates et al. | 138/42 |
| 4,593,446 | 6/1986 | Hayner | 138/42 X |
| 4,617,963 | 10/1986 | Stares | 137/625.3 |
| 4,665,946 | 5/1987 | Hulsey | 137/625.3 |
| 4,671,321 | 6/1987 | Paetzel et al. | 137/625.3 |
| 4,921,014 | 5/1990 | Tartaglia et al. | 137/625.3 |
| 4,938,450 | 7/1990 | Tripp et al. | 251/30.03 |
| 5,020,571 | 6/1991 | Tartaglia et al. | 137/625.3 |
| 5,390,896 | 2/1995 | Smirl | 251/127 |
| 5,687,763 | 11/1997 | Steinke | 137/625.33 |
| 5,732,738 | 3/1998 | Graham | 137/625.33 |
| 5,769,122 | 6/1998 | Baumann et al. | 137/625.33 |
| 5,772,178 | 6/1998 | Bey | 138/42 X |

TORTUOUS PATH FLUID PRESSURE REDUCTION DEVICE

This invention relates to fluid energy dissipation devices and in particular to such devices utilizing a tortuous path technique.

BACKGROUND OF THE INVENTION

In the control of fluid in industrial processes, such as oil and gas pipeline systems, chemical processes, etc., it is often necessary to reduce the pressure of a fluid. Adjustable flow restriction devices such as flow control valves and fluid regulators and other fixed fluid restriction devices such as diffusers, silencers, and other back pressure devices are utilized for this task. The purpose of the fluid control valve and/or other fluid restricting device in a given application may be to control flow rate or other process variables, but the restriction induces a pressure reduction inherently as a by-product of its flow control function.

One device currently available for reducing pressure of a fluid utilizes a tortuous fluid flow path technique. In this technique, the fluid flow is required to pass through a device having a plurality of fluid flow passages, each of which is constructed so as to require the fluid flow to change directions many times in a tortuous path as the fluid traverses from the device inlet to the device outlet. Each of the tortuous flow paths may be divided into at least two sub-flow tortuous paths. These devices are commonly known as "tortuous path trim devices".

In such currently available tortuous path trim devices utilizing a tortuous path technique, several deficiencies have been noted which significantly reduce the desired performance characteristics of these devices.

First of all, the jet flow in each tortuous flow passage obtains a significant momentum at an angled direction immediately before being required to split and change directions into an additional two sub-flow tortuous paths or passages. This leads to an unbalanced mass flow between the two sub-flow paths, in that the sub-flow path more in line with the jet flow momentum immediately before flow splitting contains more flow mass than the associated sub-flow path which is not in line with the jet flow momentum immediately prior to the jet flow entering the split sub-flow passages. Such an unbalanced mass jet flow creates more noise and reduces the effectiveness of the tortuous path trim device.

In addition, at the outlet stage of the jet flows in each of the flow path or sub-flow paths, the inherent tortuous path trim design results in the outlet jets colliding with each other which creates additional noise in the system.

FIG. 2 illustrates a prior art disk 30 from a prior tortuous path trim device. The disk 30 includes a hollow center portion 32 and an annular perimeter 34. A plurality of tortuous flow paths are provided between the hollow center 32 and the annular perimeter 34. On the disk 30, there is formed on one disk face a plurality of flow sub-dividing and confining passageways 36 in which the fluid flow from the disk center enters the passageway 36 from the hollow center 32 and is directed through successive right angle turns—i.e., in FIG. 2, circumferential clockwise, radial, circumferential counter-clockwise, and radial directions, etc., before encountering a splitting sub-flow section 38. In each splitting sub-flow section 38 the flow is split into two sections, each of which is then required to undergo several right angle changes in direction until finally exiting as an outlet flow jet at outlet sections 40a and 40b.

In the prior art tortuous flow path disk 30 shown in FIG. 2, it can be seen that the flow jet at outlet 40a has made a right turn forward the radial heading into the outlet with the flow momentum being towards the left, whereas the flow jet at outlet 42b is making a final left turn toward the radial heading into the outlet with the flow momentum being towards the right, and this leads to the outlet jets at the adjacent, respective outlets 40a, 42b colliding and thereby increasing the noise in the system. The same collision of jets at the outlet stages occurs for instance, at the adjacent outlet stages 40b and 44a, and around the entire perimeter of the prior art disk 30, as well as between overlapping outlet stages in respective disks in a stack.

In addition, it can be seen that immediately before entering the split sub-flow section 38 in each of the passageways 36, the flow momentum is in the right circumferential direction or clockwise direction of FIG. 2 so that the momentum tends to carry more flow mass into the rightward section of the split sub-flow section 38, than in the other or left direction (counterclockwise) direction of fluid flow.

The above recited deficiencies and others in currently available tortuous path trim devices significantly reduce the effectiveness of these devices in providing desired noise attenuation. Accordingly, it is desired to eliminate the above deficiencies as well as to provide other improvements in the tortuous path trim devices so as to enable such devices to provide enhanced noise attenuation characteristics.

SUMMARY OF THE INVENTION

In accordance with the principles of the present invention, there is provided an improved fluid pressure reduction device of the tortuous flow path type. In particular, the improved fluid pressure reduction device according to the present invention includes a plurality of stacked disks having a perimeter and hollow centers aligned along a longitudinal axis. Each disk includes a plurality of respective fluid flow passages extending from a passage inlet at the disk hollow center to a passage outlet at the disk perimeter.

Each respective fluid flow passage in the disk includes a tortuous flow path defined by at least two abrupt changes in flow direction ending at the disk perimeter. Means are provided to direct the respective fluid flows in each flow path to remain substantially independent of each other following exiting from the respective flow outlets and thereby avoid undesired collision of the flow outlets.

Each tortuous flow path may be split into two or more sub-flow paths each ending at respective sub-flow outlets at the disk perimeter. Means are provided to enable the sub-flow paths to have the same mass flow of fluid so as to balance the mass flow of fluid in each sub-flow path to the respective sub-flow outlet.

It is preferred that each of the flow outlets at the disk perimeter are spaced a substantially equal distance from each other. In addition, it is preferred that each of the flow outlets at the disk perimeter are spaced a substantially equal distance from respective flow outlets on adjacent disks in the stack. Also, in a fluid pressure reduction device with a plurality of stacked disks and tortuous flow paths extending through the stacked disks, directed flow path means are provided at the flow outlets on the stacked disk perimeter to prevent collisions between exiting outlet flows.

Means can also be provided to reduce impingement of the jet flow from the flow outlets onto the body wall of the device, such as a fluid control valve containing the pressure reduction device. Other modifications could include incorporating large plenum chambers with either tortuous paths or straight (or reversed taper) outlets. The entire pressure reduction device in the form of a cage could be made more compact and this would also aid in reducing the impingement of the jet flow from the flow outlets onto the body wall. In addition, the flow passage can be altered to incorporate a zone to allow independent flow passages to combine and continue tortuous paths to the flow outlets so as to greatly increase the flow expansion area at the outlet and thereby reduce the outlet flow velocities.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
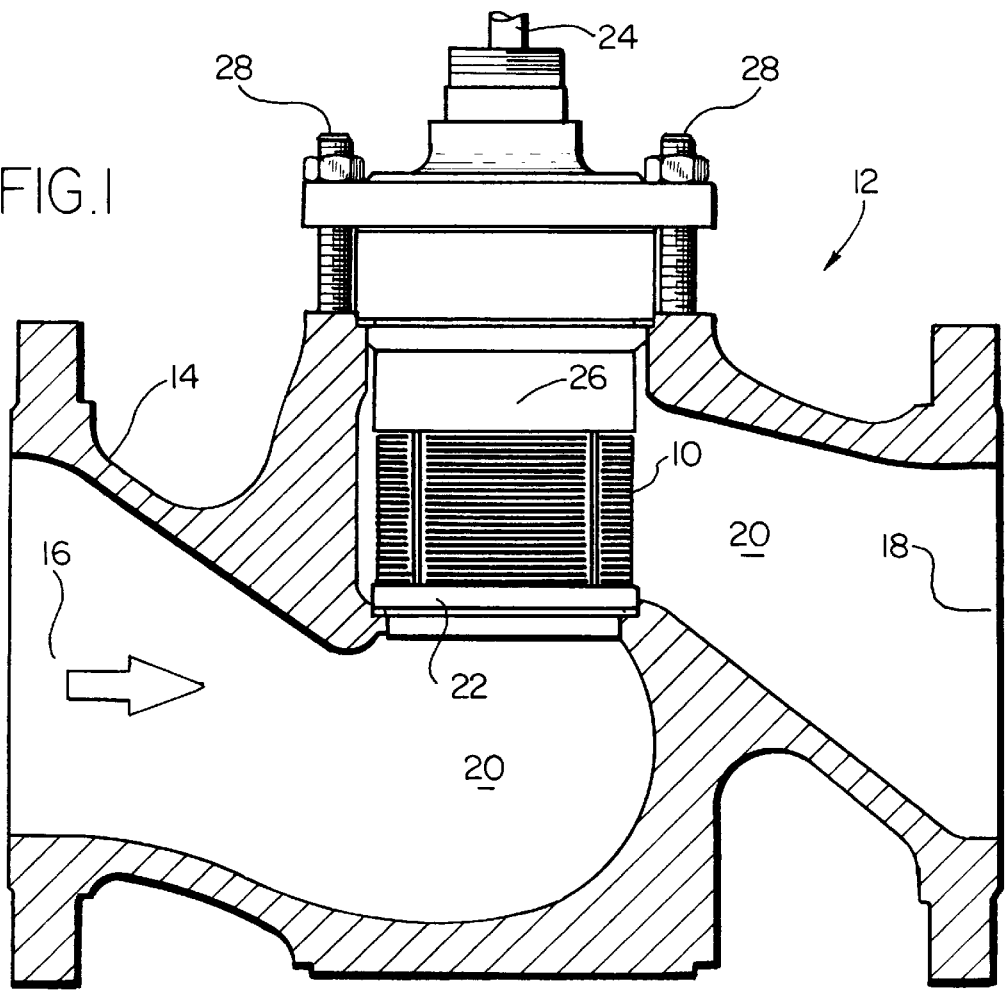
FIG. 1 is a cross-sectional view illustrating a fluid control valve containing a valve trim in the form of stacked disks forming a fluid pressure reduction device of the tortuous flow path type in accordance with the present invention.

Referring now to FIG. 1, there is illustrated a fluid pressure reduction device of the tortuous path type in accordance with the principles of the present invention. The tortuous path trim device of the present invention is in the form of a valve cage 10 having a plurality of stacked disks and mounted within a fluid control valve 12 which includes a valve body 14 having a fluid inlet 16, a fluid outlet 18, and a connecting passageway 20 through the valve body.

A seat ring 22 is mounted within the valve body passageway 20 and cooperates with a valve operating member 24 to control fluid flow into the interior and through the exterior of the valve cage 10. The valve cage 10 may be maintained within the valve by conventional mounting means such as cage retainer 26 and mounting bolts 28 engaging the valve bonnet portion of the valve in a known manner.

Figure 3A:
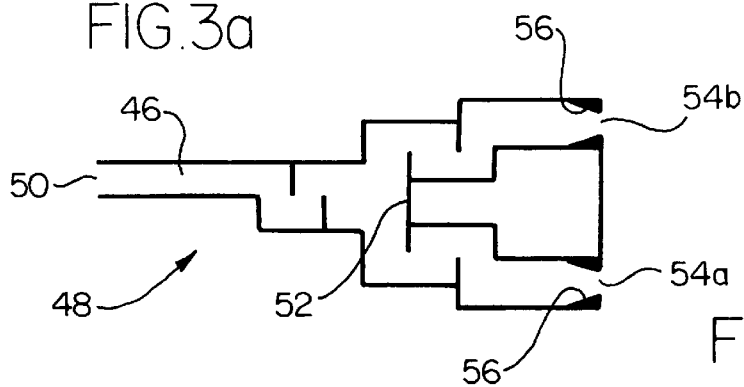
FIG. 3(a) is a schematic view illustrating an improved tortuous flow path in one of the stacked disks of FIG. 1 according to the present invention with a flow straightening outlet to prevent jet flow collisions.

Referring now to FIG. 3(a), there is illustrated one passageway 46 provided on one surface of a disk 48 in the stacked disks 10 of FIG. 1 constructed accordingly to the present invention. The passageway 46 provides a tortuous path for fluid flowing from the disk center at inlet 50, through a splitting sub-flow section 52 and to respective sub-flow outlets 54a, 54b. As can be seen from FIG. 3(a) the fluid flow through passageway 46 changes direction six times before entering the split sub-flow section 52. Each sub-flow then abruptly changes direction six times in the sub-flow section before exiting from respective outlets 54a, 54b. At the end of each outlet 54a, 54b there is provided a converging ramp or inwardly restricted tapered section 56 which tends to focus and thereby straighten out the flow outlet through the respective outlets 54a, 54b. This flow straightening provided by the tapered sections 56 enables the jets issuing from each of the sub-flow paths to remain substantially independent of each other following exiting from the respective sub-flow outlets and thereby substantially preventing undesired collision of the exiting fluid flows and thereby reducing noise. The outlets 54a, 54b are spaced from each other sufficient to prevent premature flow jet coalescence.

Figure 3B:
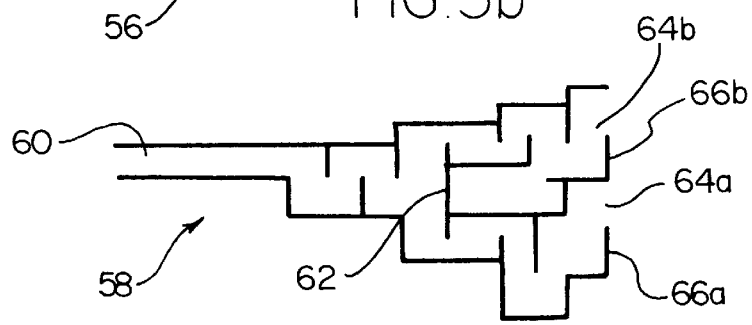
FIG. 3(b) is a schematic view illustrating another improved tortuous flow path disk embodiment of the present invention wherein the sequence of turns has been reoriented and spaced to promote parallel (but not radial) exit jet flow thus avoiding collisions.

In order to avoid sub-flow path jet collisions and thereby remain independent of each other and avoid increasing noise in the system, instead of the embodiment of FIG. 3(a), the disk embodiment of FIG. 3(b) may be provided with re-oriented and spaced outlets. FIG. 3(b) shows a disk 58 having a passageway 60 and with a splitting sub-flow section 62 ending in respective sub-flow outlets 64a, 64b. At each of the outlets 64a, 64b, there is provided a spacial separation between the outlets and a respective wall section 66a, 66b which tends to keep the respective fluid flows at the sub-flow outlets from colliding and thereby maintain them to travel substantially independent of each other.

Figure 2:
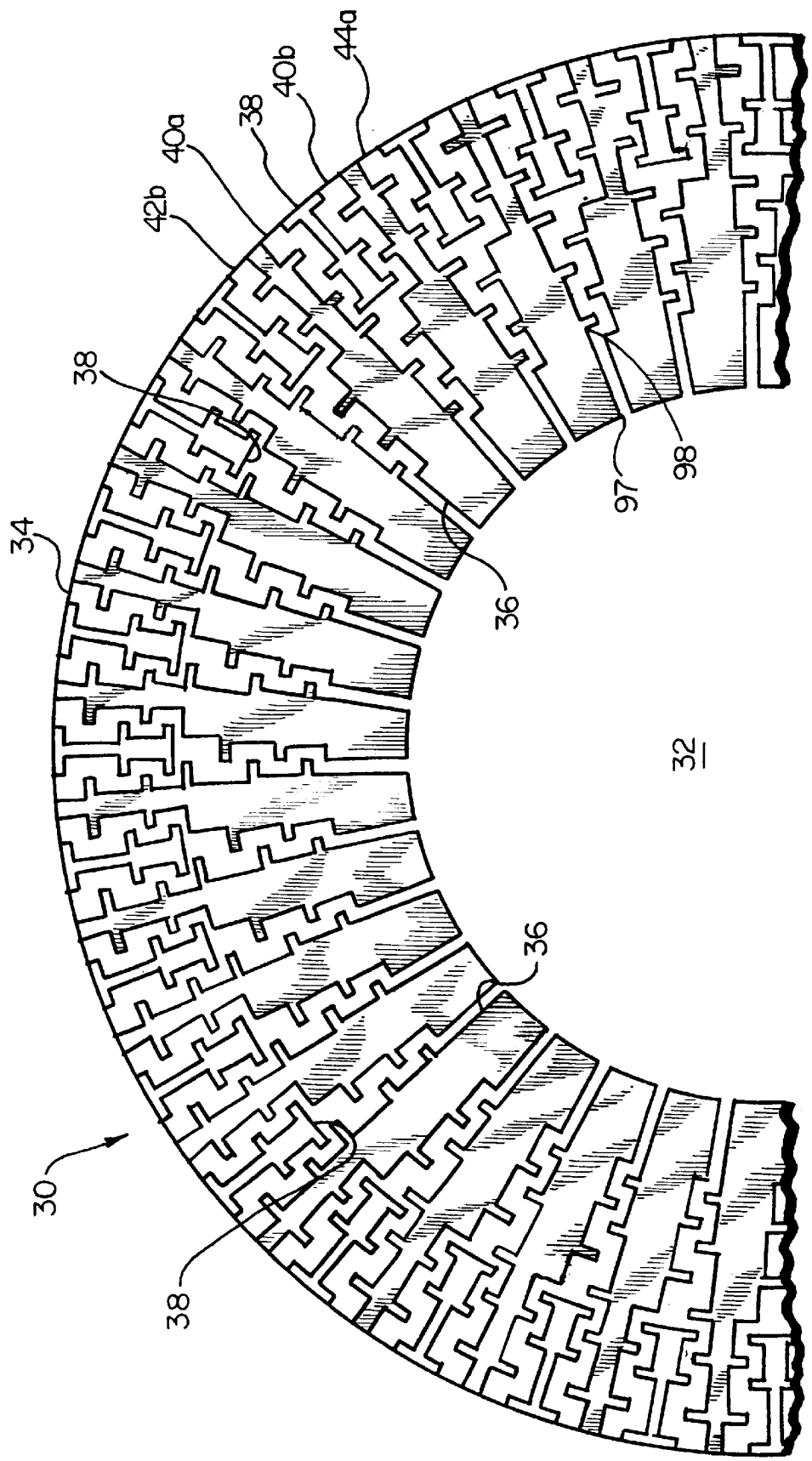
FIG. 2 is a plan view of a fragmented prior art disk illustrating the plurality of tortuous flow paths from the disk center to the disk perimeter.
Figure 4A:
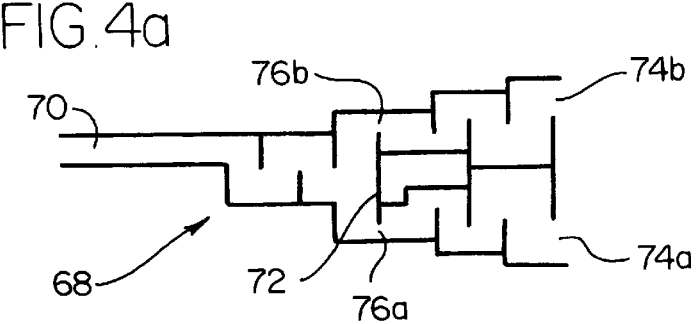
FIGS. 4(a), 4(b), and 4(c) are schematic views illustrating further embodiments of this invention with improved disk passageway structure to balance the mass flow of fluid in each sub-flow path.
Figure 4B:
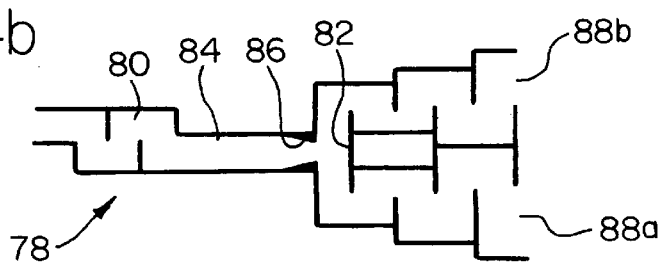
Figure 4C:
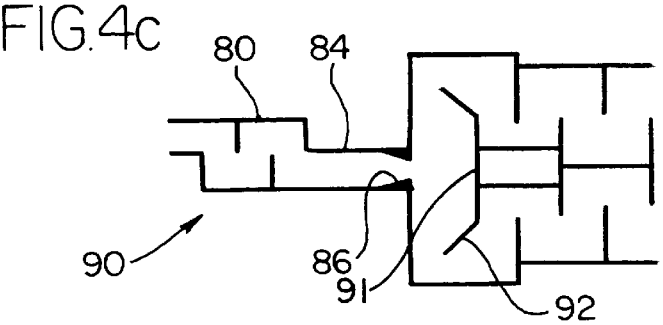

The mass flow imbalance in the prior art disk 30 of FIG. 2 results from the passage shape favoring one path at the flow passage split. FIGS. 4(a), 4(b), and 4(c) illustrate three embodiments in the present invention which can be utilized to provide a better balance of mass fluid flow through the disk passageway.

FIG. 4(a) schematically shows a disk 68 with passageway 70 having multiple abrupt changes in flow direction leading to a split sub-flow section 72 which includes several more abrupt flow directions leading eventually to respective sub-flow outlets 74a, 74b. At the entrance to the split sub-flow section 72, there is provided an obstruction in the sense that there is defined a respective sub-flow passageway 76a being more restrictive than the corresponding sub-flow passageway 76b. The more restricted sub-flow passageway 76a is located in the path of the greater split mass flow exiting passageway 70.

For instance, in FIG. 4(a), the fluid flow in passageway 70 makes six abrupt changes in direction-initially down, then right, then up, then right, then down, and finally right so that as the final fluid flow exits passageway 70 and enters sub-flow passage 72, the greater amount of mass in the fluid flow is in the downward flow momentum direction towards the more restrictive sub-flow passage 76a. Because the upper sub-flow passage 76b is not as restrictive as the opposite sub-flow passage 76a, the flow area is greater through the passageway 76b than through passageway 76a, thereby tending to balance out the mass flow in the split sub-flow passages after the passages 76a, 76b.

Because the disk 68 is annular, the previously described changes in direction in passageway 70 can also be described as being initially changed to be circumferential in one direction, then radial outwardly, then circumferentially in the opposite direction, then radially outwardly, and circumferentially in the first direction before a radial change to enter the split sub-flow section 72. Accordingly, the embodiment of FIG. 4(a) changes the flow area of the split sub-flow passageways 76a and 76b in order to equilibrate the mass flow and thereby reduce system noise.

In a disk 78 of FIG. 4(b), between a passageway 80 and a split sub-flow section 82 there is provided a flow straightening section 84. At the end of the flow straightening section 84, there is provided an inwardly tapered section 86 which focuses the flow and straightens it out as the flow enters the split sub-flow section 82. Because the flow leaving the straightener section 84 and entering the split sub-flow section 82 tends to be traveling in a straight direction, a better mass balance of fluid flow is attained leading to the sub-flow outlets 88a, 88b.

In the embodiment of FIG. 4(c) a disk 90 is provided with a passageway 80, flow straightener section 84, and a tapered end section 86 leading to a split sub-flow section 91 containing a thrust reverser 92. In this embodiment, not only is a better mass balance of fluid flow attained, but also a greater trim pressure drop is also attained.

Figure 5:
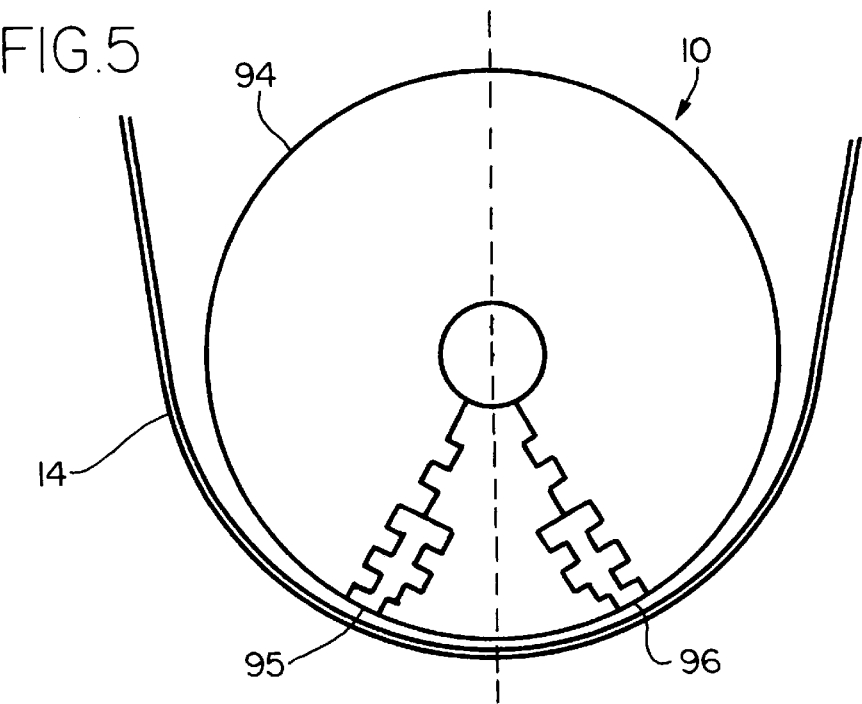
FIG. 5 is a schematic view illustrating a further improved tortuous flow path disk embodiment of this invention.

In an additional embodiment of FIG. 5, the disks 94 could be designed such that all outlet jets on one half of the stacked disks 10, such as outlets 95, are oriented in one direction, while the outlets 96 on the other half of the stacked disks are directed in the opposite direction to avoid jet flow collisions (except for minimum collisions at the final quadrant) as the jets exit the flow outlets. This would have the additional advantage that the stacked disks 10 could be oriented in the valve body 14 such that no jets exiting from the flow outlets such as 95, 96 would be directed straight into the valve body wall at the minimum clearance location, thus reducing jet/body wall impingement. If desired, at the last quadrant where a few of the outlet jets tend to collide, flow straightening techniques previously described can be used.

It is to be noted that other embodiments for improving the prior tortuous path trim devices can be provided. For instance, the disk passageways could include large plenum chambers with either tortuous paths or straight (or reversed) taper outlets. The entire cage formed by the stacked disks could be made more compact than prior tortuous flow path cage trims by eliminating much of the wasted space due to the excessive inlet section defined between points 97, 98 on prior cages as shown in FIG. 2. This would aid in reducing jet/body wall impingement. The flow passage also can be altered to include a zone to allow independent flow passages to combine and continue tortuous paths to the outlets. This embodiment would greatly increase flow expansion area. It is to be realized of course that either one of the embodiments above or two or more of these embodiments could be combined to obtain significant improvement in noise attenuation performance over prior tortuous flow path devices.

The foregoing detailed description has been given for clearness of understanding only, and no unnecessary limitations should be understood therefrom, as modifications will be obvious to those skilled in the art.

What is claimed is:

1. A fluid pressure reduction device comprising:

a plurality of stacked disks having a perimeter and hollow centers aligned along a longitudinal axis;

each disk having a plurality of respective fluid flow passages extending from a passage inlet at the disk hollow center to a passage outlet for the outlet flow at the disk perimeter;

each respective fluid flow passage including a tortuous flow path with each tortuous flow path remaining independent from each other in traversing through said disk to substantially avoid collisions between respective tortuous flow paths;

said fluid flow passages including directed flow path means at said passage outlets directing the outlet flows to substantially avoid collisions between respective outlet flows on exiting from the respective passage outlets.

2. A fluid pressure reduction device according to claim 1, said directed flow path means including independent flow path means enabling the respective fluid flow exiting from each passage outlet to remain substantially independent of each other following exiting from the respective passage outlets.

3. A fluid pressure reduction device according to claim 2, wherein each of the passage outlets at the disk perimeter is spaced a substantially equal distance from each other.

4. A fluid pressure reduction device according to claim 3, wherein each of the passage outlets at the disk perimeter is spaced a substantially equal distance from respective passage outlets on adjacent disks in the stack.

5. A fluid pressure reduction device comprising:

a plurality of stacked disks having a perimeter and hollow centers aligned along a longitudinal axis;

each disk having a plurality of respective fluid flow passages extending from a passage inlet at the disk hollow center to a passage outlet for the outlet flow at the disk perimeter;

each respective fluid flow passage including a tortuous flow path;

said fluid flow passages including directed flow path means at said passage outlets directing the outlet flows to substantially avoid collisions between respective outlet flows on exiting from the respective passage outlets;

said directed flow path means including independent flow path means enabling the respective fluid flow exiting from each passage outlet to remain substantially independent of each other following exiting from the respective passage outlets; and wherein said independent flow path means includes an inwardly tapered section at the end of each respective passage outlet for straightening the respective outlet flows on exiting from the respective passage outlets.

6. A fluid pressure reduction device according to claim 2, wherein said independent flow path means includes spacially separated respective passage outlets to enable the respective outlet flows to remain substantially independent of each other following exiting from the respective passage outlets.

7. A fluid pressure reduction device according to claim 1, wherein said directed flow path means at said passage outlets directs the outlet flows in the same direction around said disk perimeter.

8. A fluid pressure reduction device comprising:

a plurality of stacked disks having a perimeter and hollow centers aligned along a longitudinal axis;

each disk having a plurality of respective fluid flow passages extending from a passage inlet at the disk hollow center to a passage outlet for the outlet flow at the disk perimeter;

each respective fluid flow passage including a tortuous flow path;

said fluid flow passages including directed flow path means at said passage outlets directing the outlet flows to substantially avoid collisions between respective outlet flows on exiting from the respective passage outlets; and wherein said directed flow path means at said passage outlets directs the respective outlet flows (a) in one direction around one-half of the disk perimeter, and (b) in a second opposite direction around the other half of the disk perimeter.

9. A fluid pressure reduction device according to claim 8, including at selected passage outlets, said directed flow path means including in dependent flow path means enabling the respective fluid flow exiting from said selected passage outlets to remain substantially independent of each other following exiting from the selected passage outlets.

10. A fluid pressure reduction device comprising:

a plurality of stacked disks having a perimeter and hollow centers aligned along a longitudinal axis;

each disk having a plurality of respective fluid flow passages extending from a passage inlet at the disk hollow center to a passage outlet at the disk perimeter;

each respective fluid flow passage including a tortuous flow path defined by at least two abrupt changes in flow direction and a splitting sub-flow section providing at least one splitting of the fluid flow into two sub-flow paths ending at respective sub-flow outlets at the disk perimeter; and balanced mass flow means enabling the sub-flow paths to have the same mass flow of fluid so as to balance the mass flow of fluid in each sub-flow path to the respective sub-flow outlet.

11. A fluid pressure reduction device according to claim 10, wherein said balanced mass flow means includes restriction means in one of the sub-flow paths for changing the flow area of the respective sub-flow path to equilibrate the mass flow.

12. A fluid pressure reduction device according to claim 10, wherein said balanced mass flow means includes a flow straightening section in said passageway immediately adjacent and before the splitting sub-flow section.

13. A fluid pressure reduction device according to claim 12, wherein said flow straightening section includes an inwardly tapered end section.

14. A fluid pressure reduction device according to claim 10, including a flow thrust reverser in the splitting sub-flow section immediately adjacent the inwardly tapered end section.

15. A fluid pressure reduction device according to claim 10, including independent flow path means enabling the respective fluid flow exiting from each sub-flow path to remain substantially independent of each other following exiting from the respective sub-flow outlets.

16. A fluid pressure reduction device comprising:

a plurality of stacked disks having a perimeter and hollow centers aligned along a longitudinal axis;

a plurality of respective fluid flow passages defining tortuous flow paths through said stacked disks, each extending from a passage inlet at the stacked disk hollow center to a passage outlet for the outlet flow at the stacked disk perimeter;

each tortuous flow path in each disk remaining independent from each other in traversing through said disk to substantially avoid collisions between respective tortuous flow paths in each disk; and said fluid flow passages including directed flow path means at said passage outlets directing the outlet flows to substantially avoid collisions between respective outlet flows on exiting from the respective passage outlets at the perimeter of said stacked disks.

* * * * *